United States Patent [19]
Gough et al.

[11] Patent Number: 5,194,231
[45] Date of Patent: Mar. 16, 1993

[54] PACKING IN OR FOR A VESSEL

[75] Inventors: Martin J. Gough, Harborne; Stephen R. M. Ellis, Surby; John V. Rogers, Solihull, all of United Kingdom

[73] Assignee: Citten Fluid Technology Limited, United Kingdom

[21] Appl. No.: 689,853

[22] PCT Filed: Nov. 28, 1989

[86] PCT No.: PCT/GB89/01419
§ 371 Date: Jul. 12, 1991
§ 102(e) Date: Jul. 12, 1991

[87] PCT Pub. No.: WO90/06175
PCT Pub. Date: Jun. 14, 1990

[30] Foreign Application Priority Data
Nov. 28, 1988 [GB] United Kingdom ............... 8827731

[51] Int. Cl.⁵ .................... B01J 32/00; B01D 47/16
[52] U.S. Cl. ................................ 422/312; 422/310; 261/94; 261/DIG. 22; 210/150
[58] Field of Search ................ 422/310, 312; 261/94; 261/DIG. 72; 210/150; 202/158

[56] References Cited

U.S. PATENT DOCUMENTS

| | | | |
|---|---|---|---|
| 2,867,425 | 1/1959 | Teller | 261/DIG. 72 |
| 3,438,614 | 4/1969 | Lipinski | 261/DIG. 72 |
| 3,752,453 | 8/1973 | Doyne | 261/94 |
| 3,949,970 | 4/1976 | ter Braak | 366/79 |
| 4,201,736 | 5/1980 | Ellis et al. | 261/98 |
| 4,352,378 | 10/1982 | Bergmann et al. | 138/38 |
| 4,481,154 | 11/1984 | Gough et al. | 261/94 |

FOREIGN PATENT DOCUMENTS 2097910A 11/1982 United Kingdom.

*Primary Examiner*—Robert J. Warden
*Assistant Examiner*—T. A. Trembley
*Attorney, Agent, or Firm*—Marshall, O'Toole, Gerstein, Murray & Bicknell

[57] ABSTRACT

A packing for a vessel to contact fluid therein wherein the packing comprises a plurality of insert units, each insert unit comprising a plurality of transversely extending elements disposed longitudinally along the insert unit and angularly thereabout wherein a portion of each transverse element lies in close proximity to a first individual conceptual surface characterized in that the insert units are disposed in side-by-side relationship in a regular manner and the cross-sectional area between adjacent individual conceptual surfaces of adjacent insert units at least at one position longitudinally of the plurality of insert units is no greater than the maximum cross-sectional area within an individual conceptual surface of an insert unit between two adjacent transversely extending elements thereof at any cross-section longitudinally of the plurality of units.

20 Claims, 7 Drawing Sheets

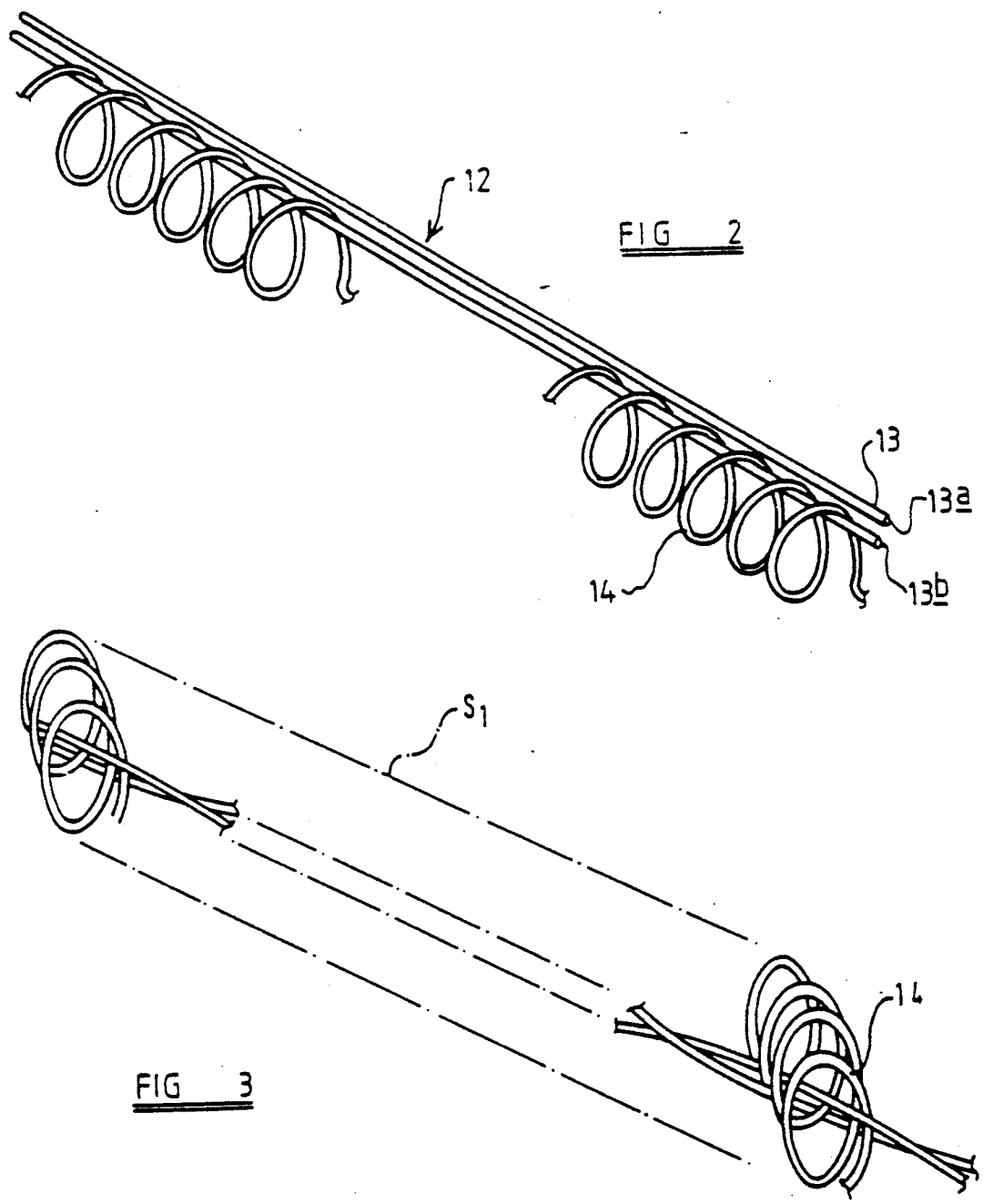

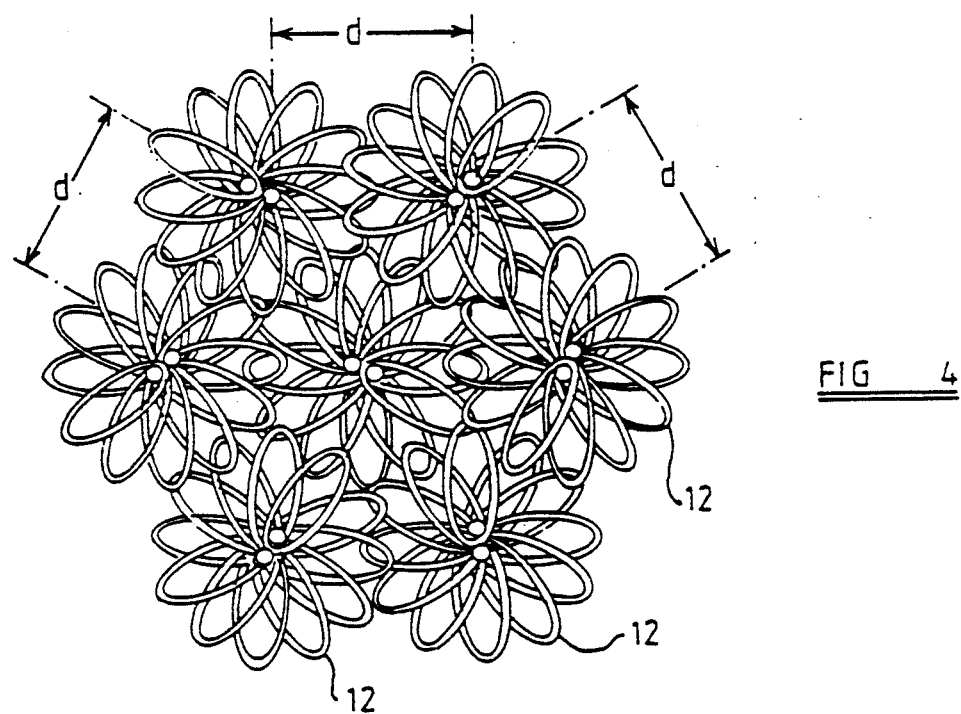
FIG 4
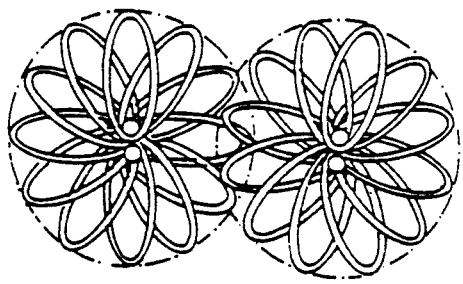
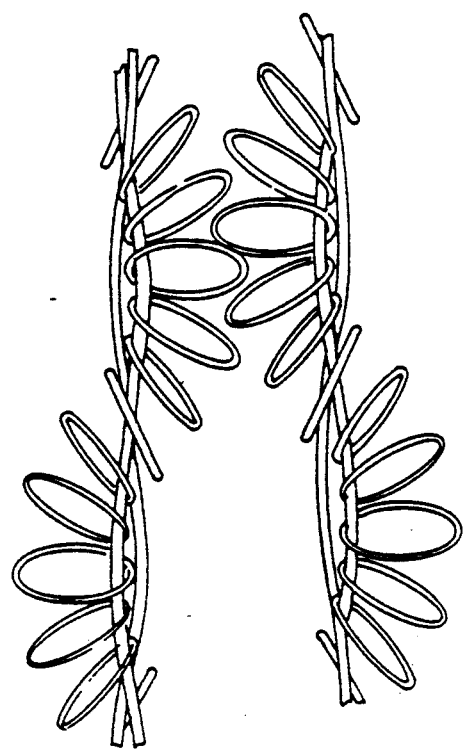
FIG 5

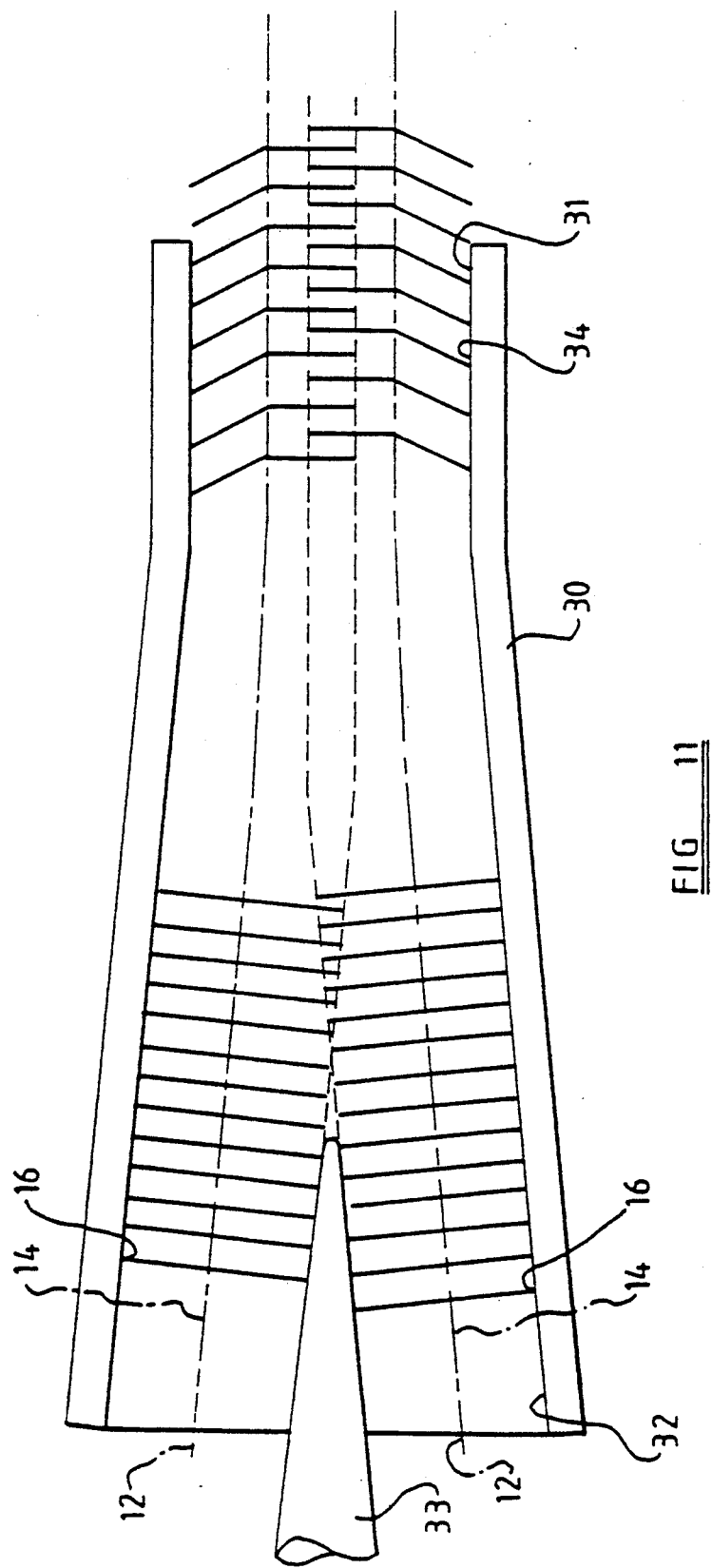
FIG_11

PACKING IN OR FOR A VESSEL

BACKGROUND OF THE INVENTION

1. Field of the Invention

This invention relates to a packing in or for a vessel to contact fluid therein.

The vessel may be a heat exchange tube for heating or cooling of fluid flowing through the tube and in this case packing improves the efficiency of heat transfer.

Alternatively, the vessel may be a fluid treatment apparatus such as a fluid-fluid or fluid-solid or fluid-fluid-solid contacting, de-entraining and/or coalescing, or extraction or liquid vapor distillation or liquid-gas absorption or other contacting, de-entraining, physical and/or chemical reactor vessel, tube, column, tower or the like. In this case packing is provided to improve, for example, one or more of the following; separation, distribution or dispersion of fluids, mixing, reacting, separation, distribution or dispersion of a fluid, or fluids and a solid, increasing the rate of diffusion or permeation in tubes used for reverse osmosis and permeation dehumidification, coalescence, drying and the like.

The above uses of a vessel having a packing disposed therein are given by way of example and explanation only and are not to be regarded as in any way limiting the scope of the protection to be afforded by this patent since a vessel having a packing disposed therein and embodying the present invention may have other uses.

2. DESCRIPTION OF THE PRIOR ART

GB-PS-483642 discloses a vessel having a single element of packing disposed therein wherein the vessel is a radiator tube for an internal combustion engine and the packing is provided to improve the efficiency of cooling of the fluid in the radiator tube. The packing has very low efficiency due to a low surface area per unit volume and the packing makes poor contact with the walls of the vessel giving high voidage, maldistribution of the fluid, low mass and heat transfer.

GB-PS-1570530 discloses a vessel having a packing disposed therein wherein the vessel comprises a fluid-fluid or fluid-solid contacting, deentrainment or reaction apparatus and the packing comprises a plurality of short articles distributed randomly within the apparatus, each article comprising two elongate members twisted together to form a central core and having trapped therebetween a plurality of convolutions which collectively extend in helical fashion about the central core. This random spring packing, because of the irregularities of the alignment of the packing elements, gives maldistribution of the fluids flowing over the packing. This maldistribution and low efficiency increases as the diameter of the vessel is increased.

GB-2097910 discloses a vessel having a packing comprising a plurality of relatively short inserts, the inserts having a length to diameter ratio not greater than 2:1 and arranged in a relatively large diameter vessel, for example, of 2 meter diameter. The inserts comprising a core having a plurality of loops disposed longitudinally therealong and angularly thereabout and are inclined to the longitudinal axis so that there is no intermeshing of the loops of adjacent side by side inserts with consequent high voidage between adjacent inserts, maldistribution of flow and the usual resultant shortcomings.

U.S. Pat. No. 2,332,110 discloses a vessel having a packing disclosed therein, wherein the vessel comprises a fractionating column. In one embodiment the packing comprises an assembly including a plurality of units, each unit consisting of a wire coiled to form a series of substantially similar loops, the loops forming areas substantially transverse to the path of said flow, the units being symmetrically disposed so that they form a generally circular composite structure with an open region in the center thereof. In a second embodiment the column has a plurality of such packing assemblies disposed therein in side by side relationship and with the part circumferentially extending portions of the looops of adjacent side by side units being separated by wire mesh enclosures which maintain each assembly intact. This packing therefore has low efficiency due to the lower surface area per unit volume of packing and the relatively high voidage giving maldistribution of the fluid.

SUMMARY OF THE INVENTION

An object of the present invention is to provide a vessel having a packing disposed therein whereby the above mentioned disadvantages are overcome or are reduced.

According to one aspect of the present invention we provide a packing for a vessel to contact fluid therein wherein the packing comprises a plurality of insert units, each insert unit comprising a plurality of transversely extending elements disposed longitudinally along the insert unit and angularly thereabout. wherein a portion of each transverse element lies in close proximity to a first individual conceptual surface characterized in that the insert units are disposed in side-by-side relationship in a regular manner and the cross-sectional area between adjacent individual conceptual surfaces of adjacent insert units at least at one position longitudinally of the plurality of insert units is no greater than the maximum cross-sectional area within an individual conceptual surface of an insert unit between two adjacent transversely extending elements thereof at any cross-section longitudinally of the plurality of units.

A packaging for a vessel to contact fluid therein according to the first aspect of the invention or when independent thereof wherein the packing comprises a plurality of insert units, each insert unit comprising a plurality of transversely extending elements disposed longitudinally along the insert unit and angularly thereabout, characterized in that the insert units are disposed in side-by-side relationship in a regular manner within the vessel and at least one transversely extending element of each unit is interstitially disposed relative to transversely extending elements of an adjacent unit.

Said at least one transversely extending element may be disposed in an interstice between radially adjacent, or longitudinally adjacent, or radially and longitudinally adjacent transverse elements of an adjacent unit.

A packing for a vessel to contact fluid therein according to the first aspect of the invention or when independent thereof wherein the packing comprises a plurality of insert units, each insert unit comprising a plurality of transversely extending elements disposed longitudinally along the insert unit and angularly thereabout, characterised in that the insert units are disposed in side-by-side relationship in a regular manner and the transverse elements are disposed so that laterally rectilinear lines, as hereindefined, extending from a central axis of each unit to a part of each transversely extending element most distant therefrom are disposed at different longitudinal positions along the axis and at different angular orientations around the axis and are inclined to the longitudinal axis at an acute angle.

The elements may be disposed so that, over the length of the vessel there is no or substantially no rectilinear flow path for fluid.

Preferably, the radially outermost parts of each transverse element of an insert unit lie on a conceptual surface. and the insert units are disposed so that said surfaces overlap without any gap between adjacent conceptual surfaces.

Each insert unit may comprise an elongate core member provided with said transverse elements longitudinally therealong and angularly thereabout.

The transverse elements may be disposed so that laterally rectilinearly lines as herein defined, extending from the core to a part of each transverse element most distant from the core, are disposed at different longitudinal positions along the core and different angular orientations around the core.

Said lines may lie in a helical surface centered on the core.

Each transverse element may comprise a loop of filamentary material and each loop may be generally circular.

Each loop may comprise at least one turn of a helical coil.

The core may comprise two elongate elements twisted together and a part of each of said loops being held between the twisted together elements.

The core elements may be relatively stronger than the loops.

A core element and/or loops may be made of multifilament material or alternatively of single filament material and may be made, for example, of metal wire.

The core elements and/or the transverse element may be made from material of any suitable cross-section material including non-circular cross-sectional filament.

The transverse element may be made of material which is of zig-zag configuration, the oscillations lying in a surface which extends longitudinally of the insert unit.

Lines intersecting laterally rectilinear lines, as hereindefined, of each loop at right angles passing through the sides of the loop may be rectilinear and substantially parallel to a diammetral plane of the core.

Each insert unit may comprise a discrete insert.

Alternatively, each insert unit may comprise part of a single insert which is formed so that said parts are disposed in said side-by-side relationship.

For example, said insert may be formed to a generally spiral shape so that adjacent turns of the spiral provide said insert units disposed in said side-by-side relationship.

Alternatively, said inserts may be formed to a helical shape so that adjacent turns of the helix provide said insert units disposed in said side-by-side relationship.

Further alternatively, said insert may be formed to a generally sinuous shape so that adjacent runs of the sinuous shape provide said units disposed in said side-by-side relationship.

Each insert unit may have a length to diameter ratio of at least 2:1, preferably at least 4:1.

A packing according to the present invention may be disposed in a vessel to contact, in use, fluid therein.

The transverse elements adjacent a wall of the vessel may be arranged so as to conform to the shape of the wall of the vessel without a gap between the conceptual enveloping surfaces on the wall and hence without any rectilinear flow path adjacent said wall and hence at any position in a cross-section of the vessel.

The transverse element adjacent the wall of the vessel may be arranged to conform to the shape of the wall of the vessel as a result of being deformed relative to the shape of the transverse elements at positions spaced from a wall of the vessel.

Alternatively, the transverse elements adjacent a wall of the vessel may be arranged to conform to the shape of the wall of the vessel as a result of being displaced relative to the shape of the transverse elements at positions spaced from a wall of the vessel.

According to a further aspect of the invention we provide a method of making a packing for placement in a vessel to contact fluid therein comprising taking an array comprising a plurality of insert units disposed in side-by-side relation, each insert unit comprising a plurality of transversely extending elements disposed longitudinally along the insert unit and angularly thereabout wherein a portion of each transversely extending element adjacent a peripheral surface of the array lies in close proximity to a first conceptual overall enveloping surface characterized in the step of acting on the transversely extending elements adjacent said peripheral surface to cause a portion thereof to lie in close proximity to a second conceptual overall enveloping surface of different cross-sectional area than said first conceptual overall enveloping surface.

Herein, by laterally rectilinear, we mean that a line which is rectilinear when viewed in a direction normal to a surface containing the loop, and by longitudinally rectilinear, we mean that the line is rectilinear when viewed along the direction line intersecting said line at right-angles and intersecting opposite sides of the loop, and by longitudinally curved, we mean that the line is curved when viewed along said direction line.

By close proximity we mean that the distance between an element and the surface lies in the range from zero and the lesser of the thickness of the element and 2 mm and preferably 1 mm.

BRIEF DESCRIPTION OF THE DRAWINGS

Examples of the invention will now be described in more detail with reference to the accompanying drawings wherein:-

FIG. 2 is a diagrammatic perspective view showing an initial stage in the manufacture of an insert for the vessel of FIG. 1;

FIG. 3 is a view similar to that of FIG. 2 showing a different stage in the manufacture of the insert of FIG. 2;

FIG. 4 is a diagrammatic end elevation of part of the packing of the vessel of FIG. 1 but showing only the loops of a single helical turn of each insert, for clarity;

FIG. 5 is a diagrammatic side and end elevation showing the interstitial disposition of loops of adjacent inserts shown in FIG. 8;

FIG. 11 is a diagrammatic illustration of a tool for use in performing the invention.

DESCRIPTION OF THE PREFERRED EMBODIMENTS

Figure 1:
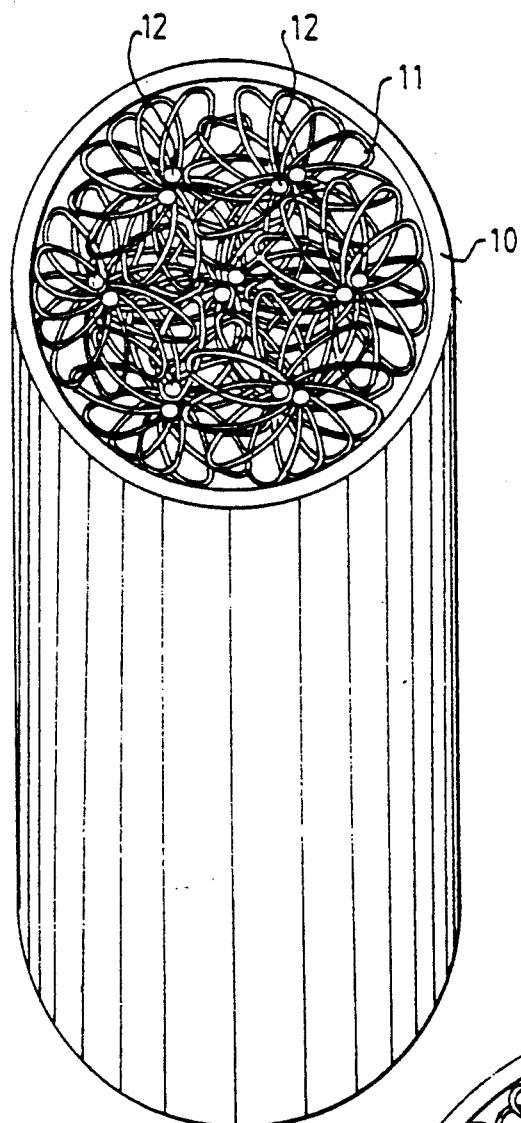
FIG. 1 is a diagrammatic view of a packed vessel embodying the invention.
Figure 1A:
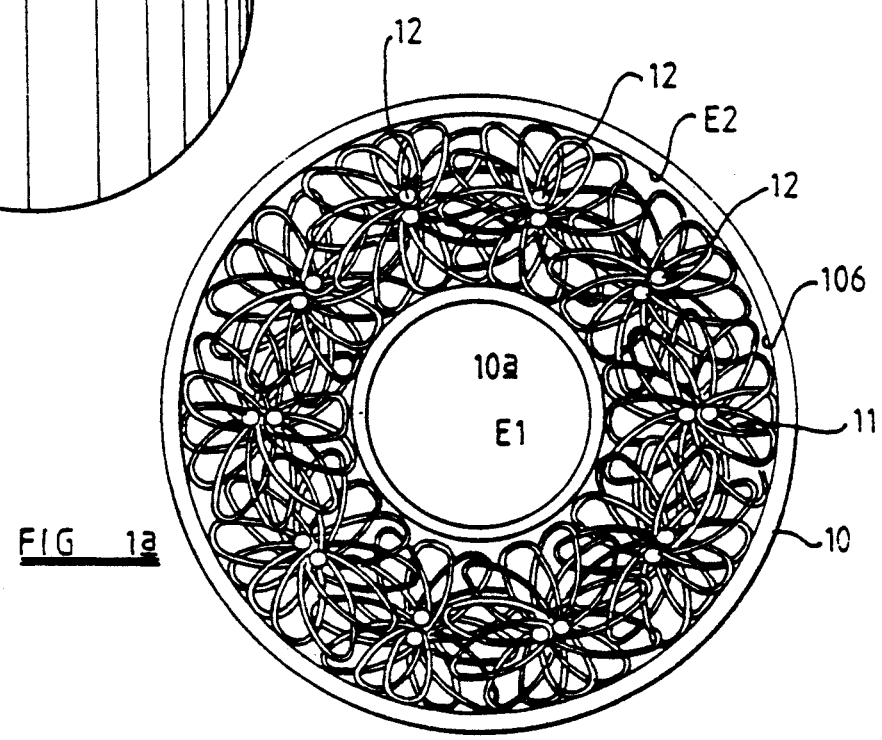
FIG. 1a is a diagrammatic view of another form of reactor vessel.

FIG. 1 shows a reactor vessel 10 having a packing 11 disposed therein. The vessel may be of other configuration, for example, the vessel may be a reactor with a central tube 10a providing a part for control instrumentation such as thermo-couples as shown in FIG. 1a. The packing 11 comprises insert units disposed within the vessel in a regular manner in side by side relationship. Each insert unit comprises a discrete insert 12 which extends throughout the full length of the vessel.

If desired, a plurality of inserts may be disposed longitudinally along the vessel, as well as side by side.

Each insert 12 is made as shown in FIG. 2 by taking a core 13. comprising a pair of spaced parallel core elements 13a, 13b, and disposing one element 13a externally and the other element 13b internally of the convolutions of a helical wire coil 14. The core elements are then twisted together so that the convolutions of the coil are trapped between the two wound together core elements and are caused to extend in a generally helical configuration about the core so that a medial line 15 of each loop 16 thus formed extending from the core to a part of the respective loop 16 at the greatest distance from the core are disposed at different longitudinal positions along the core and different angular orientations around the core, so that each line lies in a helical surface centered on the core as shown in FIG. 3. The line 15 is laterally and longitudinally rectilinear as herein defined.

In the example illustrated the core element and the wire coil 14 are made of monofilament wire, but, if desired, any one or more of these components may be made of multifilament material.

Although these components are of circular cross-section in the example described, any one or more thereof may be of non-circular configuration, such as strip shape.

In the example all these components are made of copper wire, but if desired any one or more of these components may be made of any other suitable material including, for example a synthetic plastics material.

The inserts 12, described above are introduced into the vessel 10. If desired, the plurality of inserts may be assembled together in side by side relationship as hereafter to be described prior to introduction into the vessel and then introduced into the vessel 10 as a single assembly or a plurality of inserts may be assembled together as they are introduced into the vessel 10.

Where the inserts are pre-assembled together prior to introduction into the vessel, tie members may be provided to hold the inserts in the assembly until the assembly has been introduced into the vessel.

Referring now to FIG. 4 there is shown an assembly of inserts 12. FIG. 4 is a diagrammatic illustration of an assembly where there are 12 loops for each turn of the helix and FIG. 4 shows only the loops of a single turn of each helix.

The distance d between the axes of adjacent inserts is preferably constant throughout the assembly and are shown only for some of the inserts for clarity.

The distance d is chosen so that loops of adjacent units are intersticially disposed, as illustrated diagrammatically in FIG. 5, and a part of at least some of the loops of each insert overlaps at least one loop of an adjacent insert, such that, as shown in FIG. 4, there is no portion of the cross-section which is not overlapped, thereby ensuring, over the length of the vessel, that there is no rectilinear through path for fluid bearing in mind that in respect of each insert the helical disposition of the loops ensures that there is no rectilinear flow path for fluid within an insert whilst the above mentioned overlapping ensures that there is no rectilinear flow path for fluid between inserts.

Figure 6:
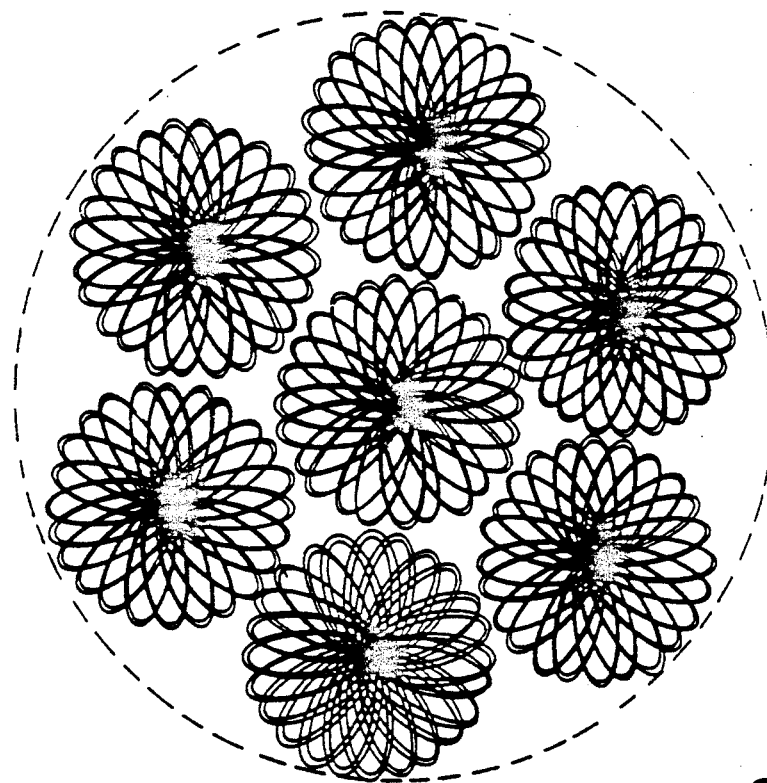
FIG. 6 is an end view of a vessel, not embodying the invention, but showing the loops of only a single helical turn of each insert, for clarity.

That is to say, each insert has a conceptual enveloping surface, on which the radially outermost part of each loop lies. Within each enveloping surface there is no rectilinear through path because the projection of the loops on an end transverse surface obturates, preferably completely, that surface. Thus, by disposing the inserts so that the conceptual surfaces overlap without any gaps between adjacent surfaces, except adjacent the walls of the vessel, the whole of the cross-section of the vessel has no or substantially no rectilinear flow path for fluid. As a result there is avoided rectilinear flow paths such as shown in FIG. 6 where the loops are not interstitially disposed.

Calculations have shown that if as little as 1% of the fluid flows down the wall of the vessel without being contacted by the packing elements and therefore not in direct contact with the gas in a column, the performance of the entire column can be adversely affected. Conversely, only a small amount of vapor passing through an open area in a column, without coming into contact with the liquid, can destroy the purity of the final vapor. Therefore, it is important that all fluid and all gas passing through a vessel, in either direction, are impeded by the loops and removed from a wall of the vessel and prevented from having a direct path through the vessel.

Figure 8:
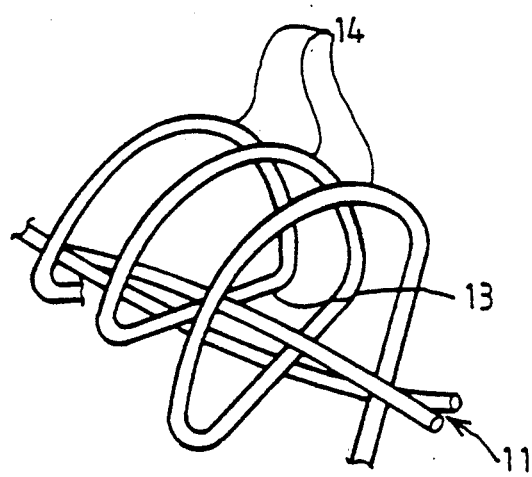
FIG. 8 is a perspective view of part of an insert made by the step shown in FIG. 4.
Figure 7:
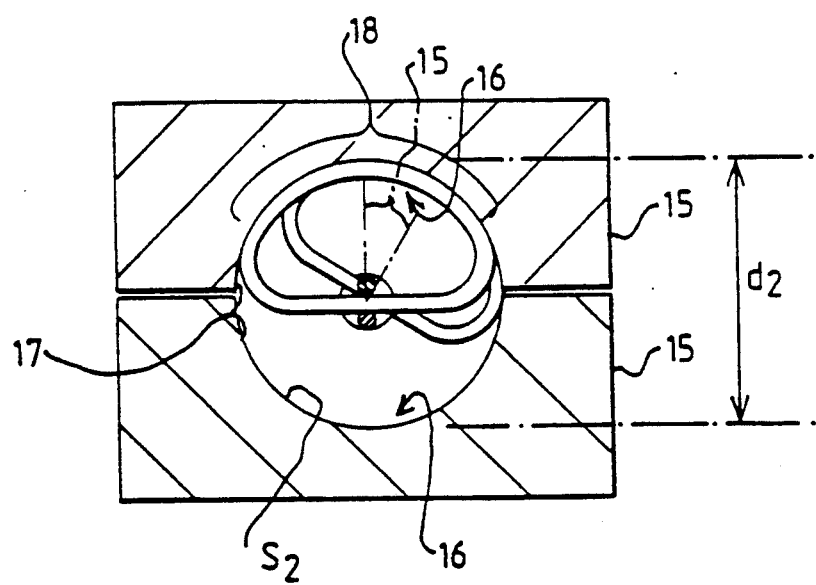
FIG. 7 is a cross-section showing a stage in the manufacture of a modification of the insert of FIG. 2.

Although in this example the loops have been described as being of the shape illustrated in FIG. 3. they may be non-circular or part-circular and lie in a plane perpendicular to the core. In this case, the loops 16. which lie in close proximity to a first conceptual enveloping surface $S_1$ of diameter $d_1$, are acted upon to cause a portion thereof to lie in close proximity to a second conceptual enveloping surface $S_2$ of smaller cross-section than the first cross-sectional surface, so that the portion in close proximity to said second conceptual surface is a greater proportion of the loop perimeter than that in close proximity to the first conceptual surface. Such a step of thus acting upon the loops 16 may be performed by acting upon the loops with dies 17 having a recess 18 therein, as shown in FIG. 7, which together define a cylindrical cavity the surface 19 of which lies in the above mentioned second conceptual surface. By acting upon the loops 16 with the dies 17 by bringing the dies 17 together the loops are deformed from the configuration they have when in contact with the first conceptual surface $S_1$, i.e. generally circular, to a non-circular configuration as shown in FIGS. 7 and 8, where a greater proportion of the loop diameter is in close proximity to the second enveloping surface $S_2$ of diameter $d_2$ smaller than diameter $d_1$ of the first surface $S_1$. However, the loops may be of other shape and configuration, for example, they may be long and narrow; for example, they may be greatly elongated ellipses or ovals and the ratio of the minor axis to the major axis may lie in the range 1:1 to 6:1. The lines 15 remain in the same orientation as is shown in FIG. 3 although they are shorter, as shown at 15' in FIG. 7.

Further alternatively, instead of the inserts having transverse elements in the form of loops, the inserts may have transverse elements in the form of single members which may be of any desired cross-sectional shape, for example, cylindrical or regular parallelepiped shape but in all cases the transverse elements of adjacent inserts overlap to the extent that there are no unobturated paths through the vessel with the possible exception of passageways partially defined by a wall of the vessel.

The radially outermost part of each insert described above lies in a conceptual enveloping surface which may be of circular cross-section. These surfaces are arranged to overlap without gaps therebetween as described above.

Figure 9:
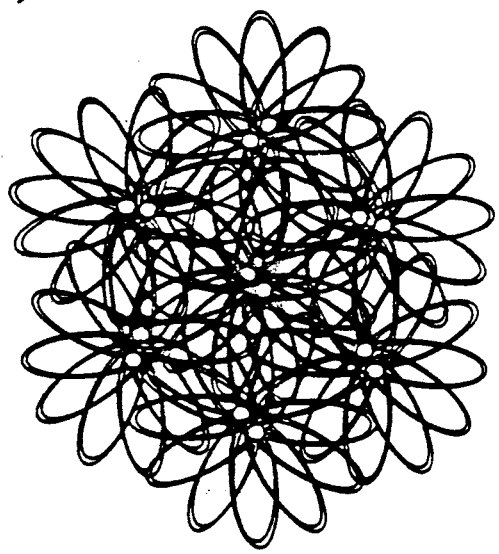
FIG. 9 is an end view similar to that of FIG. 8 but showing a more overlapped assembly.

It is preferred that the axes of adjacent inserts are positioned so that their separation is substantially equal to the sum of the radical distances from the respective cores to the radially outermost portion of the transversely extending elements, so that each element of one insert abuts or substantially abuts the core of an adjacent insert. By so doing, the coils of the adjacent inserts totally overlap, thereby increasing the obturation to a rectilinear path through the assembly. Such an arrangement is illustrated in FIG. 9.

It should be appreciated that the above referred to obturations do not necessarily occur and in general will not occur, because of angularly and longitudinally adjacent transverse elements of an insert or of adjacent inserts overlapping sequentially. For example, an angular position adjacent a given transverse element may not be obturated for a plurality of helical turns but nevertheless, taking the assembly as a whole there will be an obturation to rectilinear flow at some position along the length of the assembly, either by virtue of the projection, on an end transverse plane of the assembly, of all the components of an insert overlapping to provide obturation within the projected profile of an insert and by virtue of all the projected profiles of the inserts themselves overlapping, so as to avoid any gaps between inserts, or by virtue of the transverse elements of adjacent inserts combining together to provide an overlapped projected profile.

Where the assembly is pre-assembled, prior to introduction into the vessel the assembly as a whole may be acted upon, as described hereinbefore with regard to individual inserts, by radially moving dies similar to the dies 17 shown in FIG. 7 so as to cause those transverse elements of the assembly of inserts which are to contact the wall of the vessel to be deformed so that the external surface of the insert conforms to the shape of the die. In this case the lines 15 of the transverse elements which contact the wall of the die remain in the same orientation as prior to being acted upon by the die but are shortened so as to be similar to the lines 15' in FIG. 7. Alternatively, and preferably, the assembly may be acted upon by virtue of being passed longitudinally through a die so as to cause those transverse elements of the assembly of inserts which are to contact the wall of the vessel to be displaced so that the external surface of the insert conforms to the shape of the die. In this case the lines 15 of the transverse elements which contact the wall of the die are caused to be inclined to the longitudinal axis of the assembly, although remaining of the same length.

Figure 10:
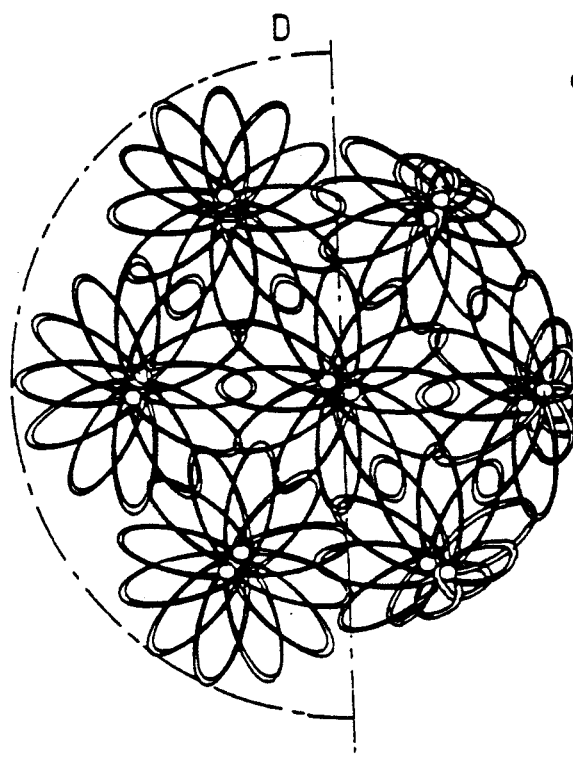
FIG. 10 is a view similar to that of FIG. 8 but with half of the Figure showing the inserts after acting on the loops of the outermost inserts to make them conform to the vessel wall.

For example, as shown in the right-hand side of FIG. 10 the external surface may be formed to a circular shape so as to eliminate any rectilinear passages within the vessel at the boundary with the vessel wall.

Instead of the loops being caused to lie an a loop surface at an acute angle to the longitudinal axis of the core as hereinbefore described, so that the lines 15 are also longitudinally rectilinear and inclined to the core at an acute angle, the loops may be caused to lie in a longitudinally curved loop surface in which lines normal to said lateral rectilinear lines and intersecting opposite sides of the loop are rectilinear, but said line 15 is longitudinally curved.

If desired the loops may be both deformed as described above and be caused to lie in an inclined loop surface as described above or in a longitudinally curved loop surface as described above.

This can conveniently be done at the same time that the individual inserts are assembled together in interstitial relationship by using the tool 30 shown in FIG. 11 which comprises an output tube 31 of an internal configuration corresponding to that of the reactor vessel interior into which the assembly is to be inserted and an entry portion 32 adapted to receive a plurality of inserts 12 made as illustrated with reference to FIGS. 2 and 3. The entry portion 32 has a guide part 33 and is of tapered configuration so that as inserts are passed through the tool their loops 16 are caused to intermesh insterstitially and the loops 16 which contact an internal surface 34 of the output tube 31 are displaced rearwardly as shown in FIG. 11 so as to cause the loops to conform to the configuration of the surface 34 without gaps therebetween and hence form a configuration in the vessel as shown in the right-hand side of FIG. 10.

For example, in use for de-entrainment coalescing, the packing shown in the left-hand side of FIG. 10 is in itself 99.0% efficient in the removal of liquid but in the left-hand side of FIG. 10 approximately by 20% of the liquid passes through the voids without being de-entrained. Since the packing operates at 99.0% efficiency with the packing operating at 99.0% efficiency 79.3 parts of liquid are removed to give an overall efficiency of 79.3%. In the case shown in the right-hand side of FIG. 10 where there is no open free paths between the elements then 99.0 parts of the liquid are removed to give an overall efficiency of 99.0%.

In a specific investigation water and air were counter-flowed through a six inch diameter circular vessel, the air flowing at a rate of 5 to 10 feet per second and water at the rate of 5,000 to 25,000 lbs. per sq. ft. per hour. With 17 insert units as described above and having contacting conceptual individual enveloping surfaces as shown in FIG. 6 and comprising cylinders of 1.2" diameter, approximately 30% of the water flow was observed to be in close proximity to the wall of the vessel.

When the investigation was repeated but with inserts as illustrated in the left-hand side of FIG. 10, where the individual inserts were originally of 1.8" diameter but with the loops interstitially disposed so that the cores were spaced 1.1" apart, 22 inserts were provided side by side in the array within the vessel and the wall flow was reduced to approximately 15% to 20%.

If desired, the assembly may be of any desired cross-sectional configuration, for example it may be of annular shape having a cylindrical or generally cylindrical external surface and a cylindrical or generally cylindrical internal passageway, the vessel itself being similarly shaped so that an external wall of the vessel surrounds the external cylindrical shape of the assembly whilst an internal wall of the vessel surrounds the internal passageway of the assembly. The shape of the internal passageway may be formed to desired configuration by acting upon the assembly with a mandrel or plug die or the like.

Although in the embodiments described hereinbefore the transverse elements of adjacent insert units have been interstitially disposed so as to provide a maximum amount of material within a packing, that is within a conceptual overall enveloping surface with which a portion of each transversely extending element adjacent a peripheral surface of an array of insert units lies in close proximity, such as a surface E1 or E2 which is co-extensive with the wall of the central tube 10a and the external wall 10b of FIG. 1a, if desired alternate means can be provided. For example, an array of inserts can be initially disposed as shown in FIG. 6 so that portions of inserts adjacent the periphery lie in close proximity to a conceptual enveloping surface illustrated in dotted line at E' in FIG. 6 and then such transversely extending members are acted upon to change the shape of the surface E' so as to reduce the cross-sectional area of the array by being acted upon either by drawing the array through a tool 30 such as shown in FIG. 11, or by acting upon it with radially movable split dies as described hereinbefore to cause the transversely extending elements which contact the surface E' to cause a portion thereof to lie in close proximity to a second conceptual enveloping surface of smaller cross-section that the first conceptual surface either by being deformed from a first configuration which they have when they are in close proximity to the first surface to a second configuration which they have when in close proximity to the second surface, as a result of being acted upon by split radially movable dies, or by being caused to be moved from lying in a loop surface which is substantially parallel to a diammetral plane of the core when in close proximity to the first conceptual surface to lie in the loop surface inclined to the longitudinal axis of the core and with the lateral rectilinear line of each loop either lying in a plane containing the core and extending radially therefrom and being rectilinear or being curved.

Further alternatively, the acting upon the array may cause the transversely extending elements of the insert units within the array to be similarly deformed or inclined so that the individual conceptual enveloping surfaces of each insert unit may be caused to decrease in cross-sectional area or any desired combination of these effects may be achieved. Also, such acting upon may cause at least partial interstitial disposition of adjacent transversely extending units. In all cases the aim is to provide a plurality of insert units in which the cross-sectional area between adjacent conceptual surfaces of adjacent insert units at least at one position longitudinally of an array of such units is no greater than the maximum cross-sectional area within a conceptual surface of an insert unit between two adjacent transversely extending elements at any cross-section of the array.

Figure 12:
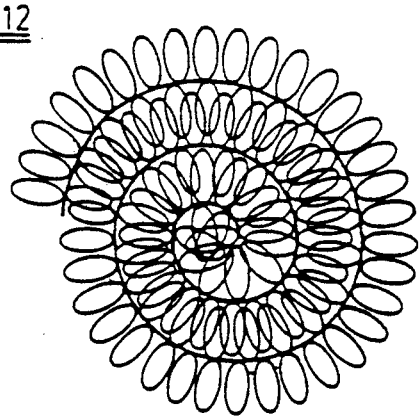
FIG. 12 shows diagrammatically an end view of part of another packing embodying the invention.

FIG. 12 shows parts of a spiral insert 12a therein. The inserts 12a are made as described hereinbefore and are formed to a spiral shape and are disposed in a vessel so that adjacent turns of a spiral provide insert units which are disposed in side-by-side relationship in a regular manner with the respective transversely extending elements of each unit being interstitially disposed. Moreover, the respective transversely extending elements of adjacent inserts 12a longitudinally of the vessel are likewise interstitially disposed. The extent of interstitial disposition is as described hereinbefore.

Figure 13:
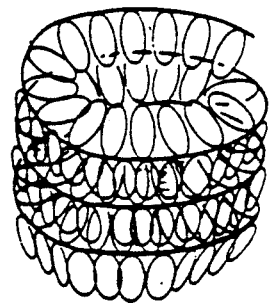
FIG. 13 shows diagrammatically a perspective view of part of a further packing embodying the invention.

FIG. 13 shows part of a helical insert 12b therein, each insert 12b is made as described hereinbefore and is formed to a helical shape and is disposed in a vessel so that adjacent turns of the helix provide insert units which are disposed in side-by-side relationship in a regular manner with the respective transversely extending elements of each unit being interstitially disposed. Moreover, the respective transversely extending elements of adjacent inserts 12b transversely of the vessel are likewise interstitially disposed. The extent of interstitial disposition is as described hereinbefore.

Figure 14:
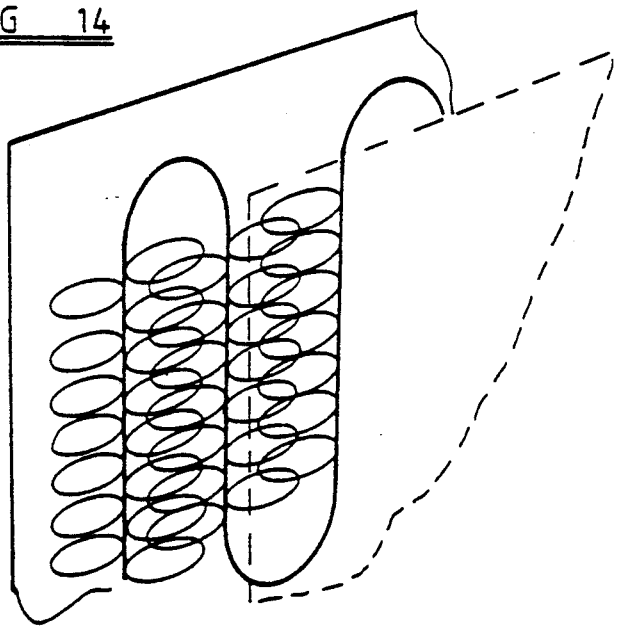
FIG. 14 shows diagrammatically part of a further vessel embodying the invention.

FIG. 14 shows a vessel where a single insert 12c is formed to a sinuous shape and is disposed in the vessel, which in this case, includes two parallel spaced plates 12d. Adjacent runs of the sinuous shape provide insert units which are disposed in side-by-side relationship in a regular manner with the respective transversely extending elements of each unit being interstitially disposed. If desired, a plurality of such inserts may be provided transversely between the plates 12d and in this case respectively transversely extending elements of adjacent inserts 12c transversely of the vessel are likewise interstitially disposed. Again, the extent of interstitial disposition is as described hereinbefore.

By providing the above described assembly with overlapped insert profiles, a large number of closely adjacent transversely extending elements are provided, thereby increasing the density of the packing and the capilliary retention ability of the assembly.

If desired, the angle of the transverse elements to the longitudinal direction of the assembly may be adjusted as desired and they may incline in different directions at different positions longitudinally of the assembly. Where the transverse elements are inclined outwardly in the direction of liquid flow, there is a tendency to displace liquid towards the external wall of the vessel, whilst where the transverse elements are inclined inwardly in the direction of fluid flow, there is a tendency for the liquid to be drawn away from the wall of the vessel. By providing different directions of inclination of different positions longitudinally of the path of fluid to the vessel, then the liquid can be constrained to flow towards and away from the walls of the vessel at different positions longitudinally of the vessel. Alternatively, the transverse elements may be disposed at an angle that does not move the fluid in either direction so that fluid flow is maintained uniform in each cross-sectional area of the vessel.

Figure 15:
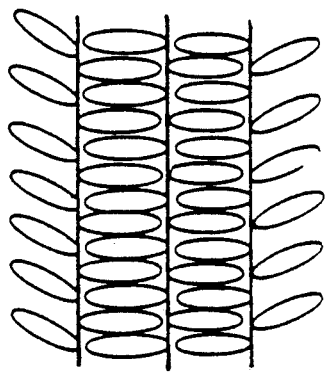
FIG. 15 shows diagrammatically part of a further packing embodying the invention.

FIG. 15 shows diagrammatically part of a vessel similar to that shown in the right-hand side of FIG. 1 which shows inclination of the transverse elements only in respect of the elements which are in contact with the wall of the vessel.

Figure 16:
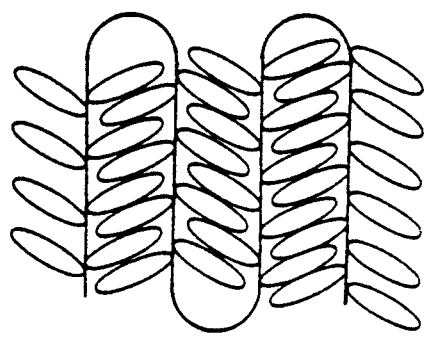
FIG. 16 shows diagrammatically part of a yet further packing embodying the invention.

FIG. 16 shows another embodiment where there is a single layer of inserts where alternate pairs of inter-engaged transverse elements are alternately inclined.

A three-dimensional array of inserts may also have inclined transverse elements either arranged with interstitially disposed transverse elements being inclined in the same direction, particularly where the angle of inclination is relatively small; or in the opposite direction.

If desired, there may be a greater number of transverse elements per unit length at different positions longitudinally of the vessel. Alternatively and/or in addition there may be a different number of transverse elements per unit length at different positions transversely of the path of liquid flow to the vessel. If desired, the internal passageway may be eccentrically disposed and/or a plurality of internal passageways may be provided within the assembly, depending upon the configuration of the vessel with which the assembly is to be used. The interstitial disposition of the transverse elements ensures that there are provided within the vessel well distributed, similarly sized voids between the transverse elements so that good distribution of fluid flowing through the packing is achieved so that maldistribution of fluid is minimized. In addition, many junction points of contact are achieved where the individual insterstitially disposed transverse elements are in contact or cross each other. These junction points aid the wetting of the packing which again mimimizes maldistribution, i.e. a minute film exists at the junction point so that it becomes a preferential point of wetting, thus aiding the even distribution of liquid.

In addition, a rigid mechanically strong packing is achieved such that the weight of packing in the vessel does not compress the packing further. Furthermore, in the operation of processing there can be fluctuations or vibrations in the flow of fluids through the packing, and since a packing embodying the invention is a rigid strong structure, there will be no compression of the packing as can occur with less rigid packing elements.

The invention may be applied to a wide range of apparatus and processes. for example, as described hereinbefore, or drying, such as removable water and solvents from solids; recovery of solvents from adsorption columns; biological processes such as growing of biomasses on solid surfaces; dissolving or stripping of gases; condensation in condensers or coils reverse osmosis, ultra-filtration, chromatography, fixed bed separation processes (gas or vapor-solid with inserts aiding vapor distribution). The inserts may themselves provide a catalyst or may support a catalyst which can be coated onto the inserts when a single phase or a plurality of phases are passed over the inserts. Alternatively, the inserts may be provided to act as a flame retardant.

An assembly embodying the invention provides a higher unit surface area/unit volume of packing than that available hitherto and the packing can be used horizontally or vertically.

The inserts may be acted upon by being deformed or displaced the method may be as described in connection with our previous specification No. GB-B-2097910 prior to assembly into an array.

The features disclosed in the foregoing description, or the following claims, or the accompanying drawings, expressed in their specific forms or in terms of a means for performing the disclosed function, or a method or process for attaining the disclosed result, or a class or group of substances or compositions, as appropriate, may, separately or in any combination of such features, be utilised for realising the invention in diverse forms thereof.

We claim:

1. A packing for a vessel wherein the packing comprises a plurality of insert units, each insert unit comprising an elongate core having a plurality of transversely extending elements disposed at different longitudinal positions along the elongate core and at different angular orientations about the elongate core, wherein the plurality of insert units are disposed in side by side relationship in a regular manner with the elongate core of each insert unit being disposed externally of each adjacent insert unit and at least one transversely extending element of each insert unit is interstitially disposed relative to transversely extending elements of an adjacent insert unit.

2. A packing for a vessel according to a claim 1 wherein a radially outermost portion of each transversely extending element lies in close proximity to a first individual enveloping conceptual surface and the cross-sectional area between adjacent overlapped individual enveloping conceptual surfaces of adjacent insert units at least at one position longitudinally of the plurality of insert units is no greater than the maximum cross-sectional area within an individual conceptual surface of an insert unit between two adjacent transversely extending elements thereof on any cross-section longitudinally of the plurality of insert units.

3. A packing according to claim 2 wherein the insert units are disposed so that said enveloping conceptual surfaces overlap without any gap between adjacent enveloping conceptual surfaces.

4. A packing according to claim 1 wherein said at least one transversely extending element is disposed in an interstice between radially adjacent, or longitudinally adjacent, or radially and longitudinally adjacent transversely extending elements of an adjacent insert unit.

5. A packing according to claim 1 wherein transversely extending elements are disposed so that laterally rectilinear lines, as herein defined, extending from a central axis of each insert unit to a part of each transversely extending element most distant therefrom are disposed at different longitudinal positions along the axis and at different angular orientations around the axis and are inclined to the longitudinal axis at an acute angle.

6. A packing according to claim 1 wherein the transversely extending elements are disposed so that over the length of the packing there is no or substantially no rectilinear flow path for fluid.

7. A packing according to claim 1 wherein each transversely extending element comprises a loop of filamentary material and wherein lines intersecting laterally rectilinear lines as herein described, of each loop at right angles passing through the sides of the loop are rectilinear and substantially parallel to a diametrical plane of the elongate core.

8. A packing according to claim 1 wherein each insert unit comprises a discrete insert.

9. A packing according to claim 1 wherein each insert unit comprises part of a single insert which is formed so that said parts are disposed in said side-by-side relationship.

10. A packing according to claim 1 wherein the transversely extending elements at a peripheral surface of the packing are deformed relative to the shape of the transversely extending elements at positions spaced from the peripheral surface.

11. A packing according to claim 1 wherein the transversely extending elements at a peripheral surface of the packing are displaced relative to the shape of the transversely extending elements at positions spaced from the peripheral surface.

12. A packing according to claim 1 when disposed in a vessel to contact, in use, fluid therein and wherein the transversely extending elements adjacent a wall of the vessel are arranged so as to conform to the shape of the wall of the vessel.

13. A packing according to claim 12 wherein said transversely extending elements adjacent a wall of the vessel are arranged to conform to the shape of the wall of the vessel as a result of being deformed relative to the shape of the transversely extending elements at positions spaced from a wall of the vessel.

14. A packing according to claim 12 wherein said transversely extending elements adjacent a wall of the vessel are arranged to conform to the shape of the wall of the vessel as a result of being displaced relative to the shape of the transversely extending elements at positions spaced from a wall of the vessel.

15. A packing according to claim 12 wherein the radially outermost parts of each transversely extending element of an insert unit lie on an enveloping conceptual surface and the transversely extending elements adjacent a wall of the vessel are arranged so as to conform to the shape of the wall of the vessel without a gap between the conceptual enveloping surfaces and the wall and without any rectilinear flow path adjacent said wall.

16. A method of making a packing for placement in a vessel to contact fluid therein comprising taking an array comprising a plurality of insert units disposed in side-by-side relation, each insert unit comprising an elongate core having a plurality of transversely extending elements disposed at different longitudinal positions along the elongate core and at different angular orientations about the elongate core wherein a portion of each transversely extending element adjacent a peripheral surface of the array lies in close proximity to a first conceptual overall enveloping surface comprising essentially of the step of acting on the transversely extending elements adjacent said peripheral surface to cause a portion thereof to lie in close proximity to a second conceptual overall enveloping surface of different cross-sectional area than said first conceptual overall enveloping surface and to cause at least one transversely extending element of a unit to be interstitially disposed relative to transversely extending elements of an adjacent unit.

17. A method according to claim 16 wherein each insert comprises an elongate core having a plurality of loops disposed longitudinally therealong and angularly thereabout wherein a portion of each loop adjacent said peripheral surface lies in close proximity to said first conceptual overall enveloping surface so that laterally rectilinear lines extending from the core to a mid-point of the portion of a respective loop in close proximity to said first overall enveloping surface are disposed at different longitudinal positions along the elongate core and at different angular orientations around the elongate core and wherein said step of acting on the transversely extending elements causes a portion of the loops adjacent said peripheral surface to lie in close proximity to said second conceptual overall enveloping surface so that the portion in close proximity to said second conceptual overall enveloping surface is a greater proportion of the loop perimeter than that in close proximity to the first conceptual overall enveloping surface.

18. A method according to claim 16 wherein a portion of each transversely extending element of each insert unit lies in close proximity to a first individual conceptual enveloping surface and wherein said step of acting on the array causes a portion of each transversely extending element to lie in close proximity to a second individual conceptual enveloping surface of smaller cross-sectional area than the said first conceptual surface and wherein each insert unit comprises an elongate core having a plurality of loops disposed longitudinally therealong and angularly thereabout wherein a portion of each loop lies in close proximity to said first conceptual individual enveloping surface so that the lateral rectilinear lines extending from the core to the mid-point of the portion of a respective loop in close proximity to said first conceptual individual enveloping surface are disposed at different longitudinal positions along the core and at different angular orientations around the elongate core and wherein said step of acting on the transversely extending elements causes the portion of the loops to lie in close proximity to said second conceptual individual enveloping surfaces so that the portion in close proximity to said second conceptual individual surfaces is a greater proportion of the perimeter than that in close proximity to the first conceptual individual surface.

19. A method according to claim 16 including the further step of disposing the package in a vessel comprising an elongate tubular portion to contact fluid therein, wherein the second conceptual overall enveloping surface has a cross-sectional configuration equal or substantially equal to that of the elongate tubular portion so that the portion of each of said transversely extending element in close proximity to said tubular portion is a greater proportion thereof than was in close proximity to the first conceptual surface.

20. A method according to claim 16 wherein said method includes the step of acting on a plurality of insert units passing them into tapered guide parts of an entry portion of a tool and withdrawing the packing from an output tube of the tool.

* * * * *